US009703399B2

(12) United States Patent
Achari et al.

(10) Patent No.: US 9,703,399 B2
(45) Date of Patent: Jul. 11, 2017

(54) DATA ENTRY STYLUS (71) Applicant: Compagnie Industrielle et Financiere d'Ingenierie "Ingenico", Paris (FR)

(72) Inventors: Karim Achari, Montgeron (FR); Fabien Huteaux, Boulogne-Billancourt (FR)

(73) Assignee: INGENIGO GROUP, Paris (FR)

( * ) Notice: Subject to any disclaimer, the term of this patent is extended or adjusted under 35 U.S.C. 154(b) by 0 days.

(21) Appl. No.: 14/410,073

(22) PCT Filed: Jun. 21, 2013

(86) PCT No.: PCT/EP2013/063066
§ 371 (c)(1),
(2) Date: Dec. 20, 2014

(87) PCT Pub. No.: WO2013/190124
PCT Pub. Date: Dec. 27, 2013

(65) Prior Publication Data
US 2015/0338936 A1 Nov. 26, 2015

(30) Foreign Application Priority Data
Jun. 22, 2012 (FR) .................... 12 55952

(51) Int. Cl.
*G06F 3/0354* (2013.01)
*G06F 3/041* (2006.01)
(52) U.S. Cl.
CPC ........ *G06F 3/03545* (2013.01); *G06F 3/0414* (2013.01)

(58) Field of Classification Search
None
See application file for complete search history.

(56) References Cited

U.S. PATENT DOCUMENTS

| 5,414,227 | A | 5/1995 | Schubert et al. | |
|---|---|---|---|---|
| 2011/0304577 | A1* | 12/2011 | Brown | G06F 3/03545 345/174 |
| 2012/0146957 | A1 | 6/2012 | Dunagan | |
| 2012/0327040 | A1* | 12/2012 | Simon | G06F 3/044 345/179 |

(Continued)

FOREIGN PATENT DOCUMENTS

| DE | 202011104019 U1 | 11/2011 |
|---|---|---|
| EP | 0727756 A1 | 8/1996 |

OTHER PUBLICATIONS

International Search Report dated Aug. 15, 2013 for corresponding International Patent Application No. PCT/EP2013/063066, filed Jun. 21, 2013.

(Continued)

*Primary Examiner* — Alexander Eisen
*Assistant Examiner* — Kebede Teshome
(74) *Attorney, Agent, or Firm* — David D. Brush; Westman, Champlin & Koehler, P.A.

(57) ABSTRACT

A data entry stylus for entering data onto an entry pad. The stylus includes a body having a housing. The stylus includes: a reference element, having two distinct portions, a first portion sitting within the housing and a second portion, including a tip the end of which is at least hemispherical; and a damper forming a cladding around at least a part of the reference element, including an external wall.

10 Claims, 5 Drawing Sheets

(56) References Cited

U.S. PATENT DOCUMENTS

2013/0106777 A1* 5/2013 Yilmaz .............. G06F 3/03545
 345/174
2013/0194242 A1* 8/2013 Park ................... G06F 3/03545
 345/179

OTHER PUBLICATIONS

English translation of Written Opinion dated Dec. 22, 2014 for corresponding International Patent Application No. PCT/EP2013/063066, filed Jun. 21, 2013.

* cited by examiner

DATA ENTRY STYLUS

1 CROSS-REFERENCE TO RELATED APPLICATIONS

This Application is a Section 371 National Stage Application of International Application No. PCT/EP2013/063066, filed Jun. 21, 2013, which is incorporated by reference in its entirety and published as WO 2013/190124 on Dec. 27, 2013, not in English.

2 FIELD OF THE INVENTION

The invention described relates to the field of devices for entering data on to screens and touch pads. More particularly, the present invention pertains to the field of styluses for screens and touch pads.

3 PRIOR-ART SOLUTIONS

There are known pointing devices in the prior art, called styluses, intended for use on tablets. These may be dedicated tablets such as tablets for drawing. Recently, this type of tablet has undergone major progress. This progress is related chiefly to the fact that portable telephone or smartphone type terminals have undergone major changes, including especially the addition of touch pads enabling direct entry on to the screen of the terminal.

As a rule, such entry is done by finger. Other modes of entry are also possible, among them the use of a stylus. However, this stylus is a passive element whose function is to imitate the finger to enable selection and/or use on a telephone-type terminal screen. The stylus therefore has a rounded tip that is relatively bulky (of the order of one cubic centimeter).

Styluses intended for graphic tablets implement other technologies. First of all, the tip of this type of stylus is relatively fine. This is explained by the fact that this type of stylus is intended for the reproduction of precise illustrations, such as for example drawings, graphics or again handwriting. This type of work is fine and therefore requires an instrument offering a high level of precision. Pressure-sensitive styluses have been developed and commercially distributed over the years. These styluses take account of the pressure exerted by the user during use on a surface (whether it is a touch screen or another type of support). Although these styluses are more ergonomical and more precise than the simple non-pressure-sensitive styluses, they are not satisfactory.

Indeed, one of the problems encountered with styluses relates to the measurement of pressure when the stylus is tilted. The first pressure-sensitive styluses did not accurately take account of the fact that the stylus was tilted, so that for a same pressure exerted, the computed value of the pressure differed according to whether the stylus was tilted or not. Another problem lies in the cost of manufacture of such styluses. Indeed, as shall be seen, these styluses include numerous elements, the assembling of which is a complex process.

Devices have been designed to overcome at least certain of the problems mentioned here above.

There is a stylus known from the patent application No. EP0727756 that possesses a pressure-sensitive device used to detect a force of pressure even when this stylus is in an oblique position. The pressure sensor uses modifications of inductance generated by the relative shift between a mobile magnetic body and a fixed magnetic body around which a coil is wound, this coil being positioned at a predetermined distance from the mobile magnetic body. The end of the device, situated at the end of the stylus, has a contact portion receiving a pressure exerted on the stylus. The device also includes an element made out of an elastic material situated between the fixed and mobile magnetic bodies: a first supporting device maintaining the position of the fixed magnetic body despite a depression, and a second supporting device maintaining the depression member in a condition in which the rear plate of the mobile magnetic body and the forward plate of the fixed magnetic body are placed in parallel with each other in receiving the depression.

Figure 3:
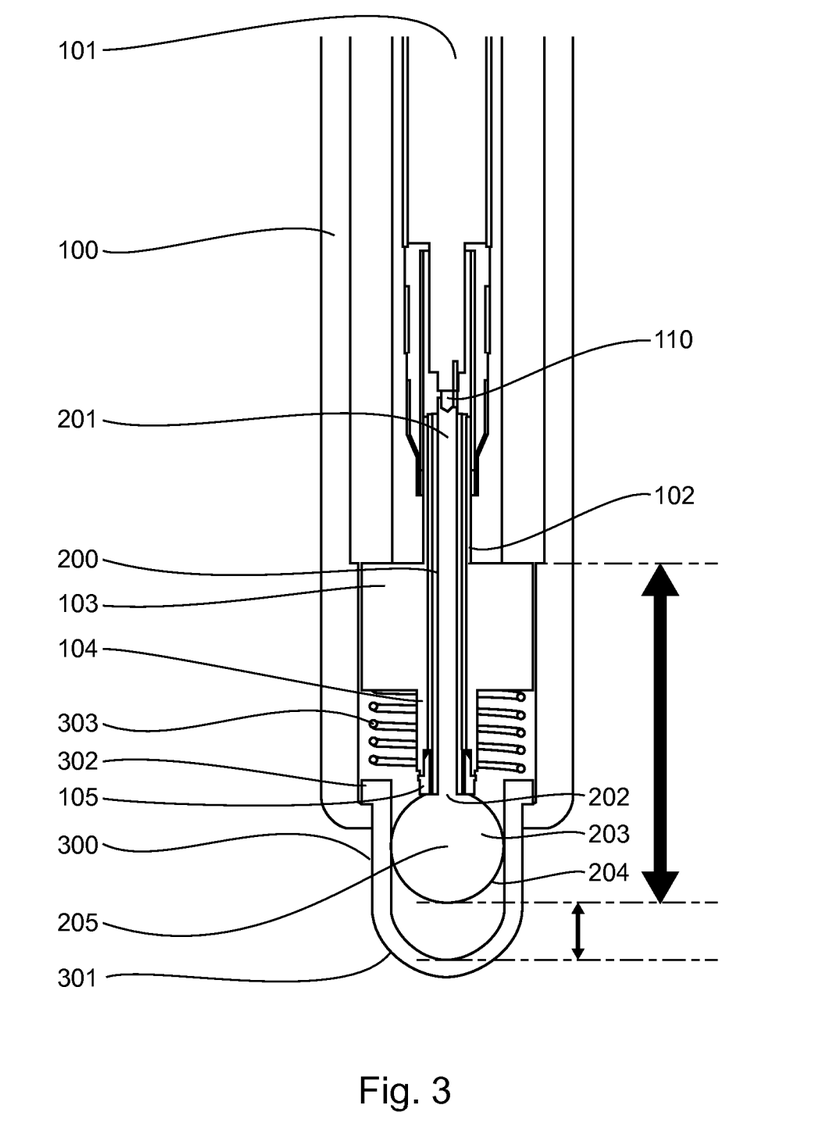
FIG. 3 shows a third embodiment of a stylus.

In other words, in this prior-art device, two magnetic bodies are positioned inside the stylus. When a pressure is exerted on the stylus, the mobile magnetic body is brought closer to the fixed magnetic body. The magnetic field is therefore modified, thus causing a modification of the inductance at the surface of the tablet or screen on which the stylus is used. As indicated in FIG. 3 of this patent EP0727756, the surface of the tablet includes a mesh enabling the inductance to be measured.

This type of stylus nevertheless has a problem. On the one hand it is heavily linked to the technology used by the tablet (i.e. there is a modification of the inductance induced by the modification of the magnetic field inside the stylus), and secondly it is complex and costly to manufacture.

4 SUMMARY OF THE INVENTION

The invention does not show these problems of the prior art. Indeed, the invention pertains to a stylus for entering data on to an entry pad, said stylus comprising a body comprising a housing characterized in that it comprises:
  a reference element comprising two distinct portions:
    a first portion seated within said housing;
    a second portion comprising a tip, the end of which is at least hemispherical;
  a damper forming a cladding around at least one part of said reference element comprising an external wall, called an external wall of said damper.

Thus, the stylus can be used to carry out a measurement of the pressure exerted on the pad uniformly, whatever the tilt of the stylus. This is made possible by the use of a tip that is at least substantially hemispherical, firstly ensuring that the distance between the pad and the reference element is constant depending on the tilt and, secondly, applying a method for measuring pressure based on this distance.

According to one particular characteristic, said damper is made out of a flexible and deformable material.

Thus, the design of the stylus is simple and does not require any complicated and costly construction method.

According to one particular characteristic, said damper is hemispherical.

Thus, by using a shape that is also hemispherical for the damper, it is also provided that the distance between the pad and the reference element will not be modified by the shape of the tip of the stylus.

According to one particular embodiment, said end is substantially spherical.

Thus, even if the stylus is almost horizontal relatively to the pad, it is ensured that the pressure can always be measured.

According to one particular embodiment, said damper comprises a cylindrical sleeve comprising a first hemispherical end, the internal diameter of the cylindrical sleeve being substantially equal to the diameter of the at least hemispherical end of the reference element.

According to one particular characteristic, said damper furthermore comprises a second end comprising a retaining ring for retaining said damper in said housing.

Thus, it is also possible to implement a mechanical damper in place of a deformable damper.

According to one particular characteristic, a space left vacant between said first hemispherical end and the at least hemispherical end of the reference element is filled with electrically charged deformable material.

Thus, the sensitivity of the stylus on the pad is increased.

According to one particular characteristic, said damper is mobile in translation according to the pressure exerted on the stylus.

The invention also pertains to a method for measuring a pressure exerted during the entry of data by a user, entered on a pad via a stylus as described here above. According to the invention, such a method comprises:
- a step of acquisition, by said writing surface, at at least one instant of the entry, of at least one piece of data representing a distance d of said stylus relative to said pad, in a zone of proximity of said pad;
- a step for computing pressure exerted on said pad taking account of said distance d.

The invention also pertains, in another form, to a computer program product downloadable from a communications network and/or stored on a computer-readable support and/or executable by a microprocessor. According to the invention, such a program comprises program code instructions to execute the method for measuring as presented here above when it is executed on a computer.

5 LIST OF FIGURES

Other features and advantages of the invention shall appear more clearly from the following description of a preferred embodiment, given by way of a simple illustratory and non-exhaustive example and from the appended drawings, of which:

FIG. 5 schematically illustrates a device for measuring pressure.

6 DETAILED DESCRIPTION OF THE INVENTION

6.1 Reminder of the Principle of the Invention

The object of the present disclosure is to propose a technique that can be used to measure the pressure exerted by the user through a stylus in a simpler and more efficient way than with the previously proposed techniques. More specifically, the proposed invention is based on a computation of a distance (d) between an internal component of the stylus and the pad (which is or is not a touch pad) on which the stylus is used.

The capacitive touch screens of recent generations enable a precise measurement of the surface of contact between the pad of the screen and any other object to which the touch screen is sensitive (a finger, a hand, a tip of a stylus made out of a conductive material, etc).

By using a stylus whose tip is made out of a non-conductive deformable material, the mechanical resistance and hence the deformation of which is known, or else is formed by a mobile rigid case, connected to the sleeve by return means, surrounding a metallic tip, or else again is made of a dielectric material, it is possible, from the distance measured by the entire touch screen between the pad and the metal tip, to deduce the pressure applied by the user throughout his entry operation.

The non-neutral internal element of the stylus detected by the touch screen can be either made out of a conductive metal in the case of an active pen (the pen constitutes the sensor or the emitter) or else made simply out of a dielectric in the case of a passive pen (the stylus is deliberately interposed as a disturbing element between the emitter and the receiver, both contained in the touch screen). Here below, this internal element which serves as a basis for measuring the distance, is qualified as a reference element. It is either conductive or passive depending on the technology of the stylus used.

The variations of pressure during the entry are thus an additional biometric parameter to enable various actions such as the authentication or non-authentication of a signature and hence of the person who is in the process of signing.

6.2 Description of Embodiments

As described here above, in order to avoid problems related to the prior-art devices and especially the complexity of manufacture of devices such as those described in the document EP0727756, the inventors had the idea firstly of computing the pressure exerted on the basis of a distance (d) between the reference element (incorporated into the stylus) and the pad on which the stylus is used and secondly of making sure that this pressure (computed from the distance) will be the same whatever the position of the stylus on the pad. More particularly, the technique described makes it possible to ensure that the pressure will be measured in the same way whatever the angle of tilt of the stylus.

This result is made possible by ensuring that the tilt of the stylus is independent of the distance between the reference element of the stylus and the pad. Hitherto, it was not possible to ensure this independence. The technique described offers this result by proposing the combination of two distinct characteristics used to obtain the intended result.

The first characteristic is the use of a reference element, one end of which is at least hemispherical and at most appreciably spherical, said reference element being fixed and constituting a reference point. In other words, the end of the reference element has a shape ranging from a semi-sphere to a sphere. The reference element is not itself in contact with the surface of the pad. It is integrated into the body of the stylus. The reference element comprises an end having a predetermined shape. This shape is hemispherical in one embodiment. This means that the end of the reference element is hemispherical. The rest of the reference element shaped in order to be integrated into the stylus. However, depending on the embodiments, the rest of the reference element can have a specific shape or a shape between that of a half-sphere and a sphere, which is not solely related to the positioning of the reference element in the body of the stylus, as specified here below. The purpose of this shape (hemispherical or substantially spherical) lies in the fact that whatever the tilt of the stylus, the distance between the surface of the pad and the reference element (more specifically a reference point of the reference element) does not vary.

The second characteristic is the use of a damper that forms a cladding around the reference element. The external wall of the damper constitutes the point of contact between the stylus and the surface of the pad. The damper acts as a variator of distance between the reference element (and above all the reference tip of the reference element) and the surface of the pad. This damping function makes it possible to vary the pressure exerted on the stylus. Depending on the embodiment, the damper is either mechanical (in this case it is mobile between two positions) or deformable (in this case it can be crushed).

Here below, three embodiments of the stylus that is the object of the disclosure are presented. Each of these embodiments corresponds to a particular implementation of the principles described here above.

6.2.1 Hemispherical Reference Element

Figure 1:
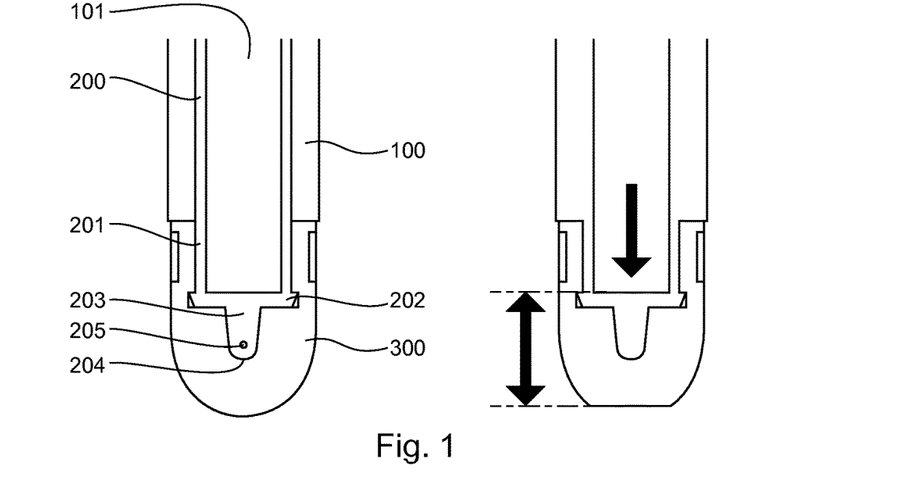
FIG. 1 shows a first embodiment of a stylus.

This embodiment is presented with reference to FIG. 1. In this embodiment, the stylus has a hollow body 100 comprising a housing 101. Usually, this body has an overall tubular shape. In this housing 101, a reference element 200 is inserted. This reference element 200 has two distinct portions: a first portion 201 is seated inside the housing 101. This first portion is shaped for this function. It can be fixed by gluing, fitting together or any appropriate method.

The second portion 202 comprises a tip 203 having a hemispherical end 204. The central point 205 of the hemispherical end is the reference point serving to evaluate the distance from the pad. The reference point is defined so that a quasi-absence of pressure exerted on the stylus is interpreted as a quasi-absence of pressure (and therefore gives a line of normal thickness). The pressure exerted is interpreted by means of a component that can be implemented either in the tablet itself or in a terminal to which the tablet is connected.

The second portion 202 is covered with a non-conductive casing 300. This casing 300 is made of flexible and deformable material and plays the role of a damper. Since this casing is deformable, according to the pressure exerted by the user on the stylus, the distance between the reference point and the pad varies. This has the effect of modifying the load on the pad and therefore enables the pressure to be deduced for example.

6.2.2 Substantially Spherical Reference Element

Figure 2:
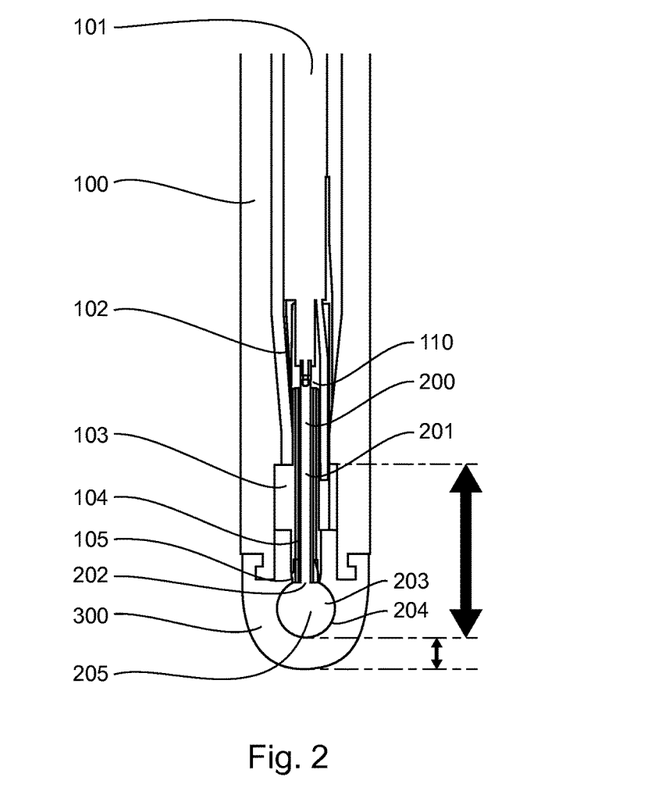
FIG. 2 shows a second embodiment of a stylus.

In this embodiment, presented with reference to FIG. 2, the stylus comprises a hollow body 100 comprising a housing 101. Usually, this body has an overall tubular shape. In this housing 101, a reference element 200 is inserted. In the housing 101, in addition to the reference element 200, there is also a shielding or protective sheath 102, a shield 103, an insulating shield 104 and an insulating ring 105.

The reference element 200 comprises two distinct portions: a first portion 201 is seated within the housing 101, inside the insulators (insulating shield 104, insulating ring 105) and extends so as to come into contact with an electrical contact element 110, if any, of the stylus (this is true in the case of an active stylus, and this electrical contact element 110 can be absent in the case of a passive stylus). This first portion 201 is shaped for these functions of maintaining and assembling and possibly of contact inside the stylus.

The second portion 202 comprises a tip 203 having a substantially spherical end 204. The central tip 205 of the hemispherical end is the reference point used to evaluate the distance from the pad. The reference point is defined so that a quasi-absence of pressure exerted on the stylus is interpreted as a quasi-absence of pressure (and therefore gives a line of normal thickness). The pressure exerted is interpreted by means of a component which can be implemented either in the pad itself or in a terminal to which the pad is connected.

The second portion 202 is covered with a non-conductive casing 300. This casing 300, made of flexible and deformable material, plays the role of a damper. Since this casing is deformable, depending on the pressure exerted by the user on the stylus, the distance between the reference point 205 and the surface of the pad varies. This has the effect of modifying the load on the pad and hence makes it possible to deduce the pressure for example.

6.2.3 Substantially Spherical Reference Element, Mechanical Damper

In this embodiment, presented with reference to FIG. 3, the stylus comprises a hollow body 100 comprising a housing 101. Usually, this body has an overall tubular shape. In this housing 101, a reference element 200 is inserted. In the housing 101, in addition to the reference element 200, there is also a screening sheath 102, a shield 103, an insulating shield 104 and an insulating ring 105.

The reference element 200 comprises two distinct portions: a first portion 201 is seated within the housing 101, inside the insulators (insulating shield 104, insulating ring 105) and extends to come into contact with an electrical contact element 110, if any, of the stylus (this is true in the case of an active stylus, and this electrical contact element 110 can be absent in the case of a passive stylus). This first portion 201 is shaped for these functions of maintaining and assembling and possibly of contact inside the stylus.

The second portion 202 comprises a tip 203 having a substantially spherical end 204. The central tip 205 of the hemispherical end is the reference point used to evaluate the distance from the pad. The reference point is defined so that a quasi-absence of pressure exerted on the stylus is interpreted as a quasi-absence of pressure (and therefore gives a line of normal thickness). The pressure exerted is interpreted by means of a component that can be implemented either in the pad itself or in a terminal to which the pad is connected.

The second portion 202 is covered with a non-conductive casing 300. This casing 300, made of solid and non-deformable material, plays the role of a damper. This casing 300 has a general shape of a cylindrical sleeve comprising a first hemispherical end 301. The internal diameter of the cylindrical sleeve is substantially equal to the diameter of the substantially spherical end 204 of the reference element 200. The hemispherical end 301 is also shaped so that it can receive the substantially spherical end 204 of the tip 203 of the second portion 202 of the reference element 200. The second end of the casing 300 comprises a ring 302. This ring 302 blocks the casing 300 in the housing 101. The casing 300 is mobile in translation depending on the pressure exerted on the stylus. The return of the casing to the initial position is ensured by the use of return means 300 (such as a spring) inserted into the housing 101 and resting on the ring 302.

Depending on the pressure exerted by the user on the stylus, the distance between the central reference point and the pad varies. This has the effect of modifying the load on the pad and therefore enabling the pressure to be deduced.

Figure 4:
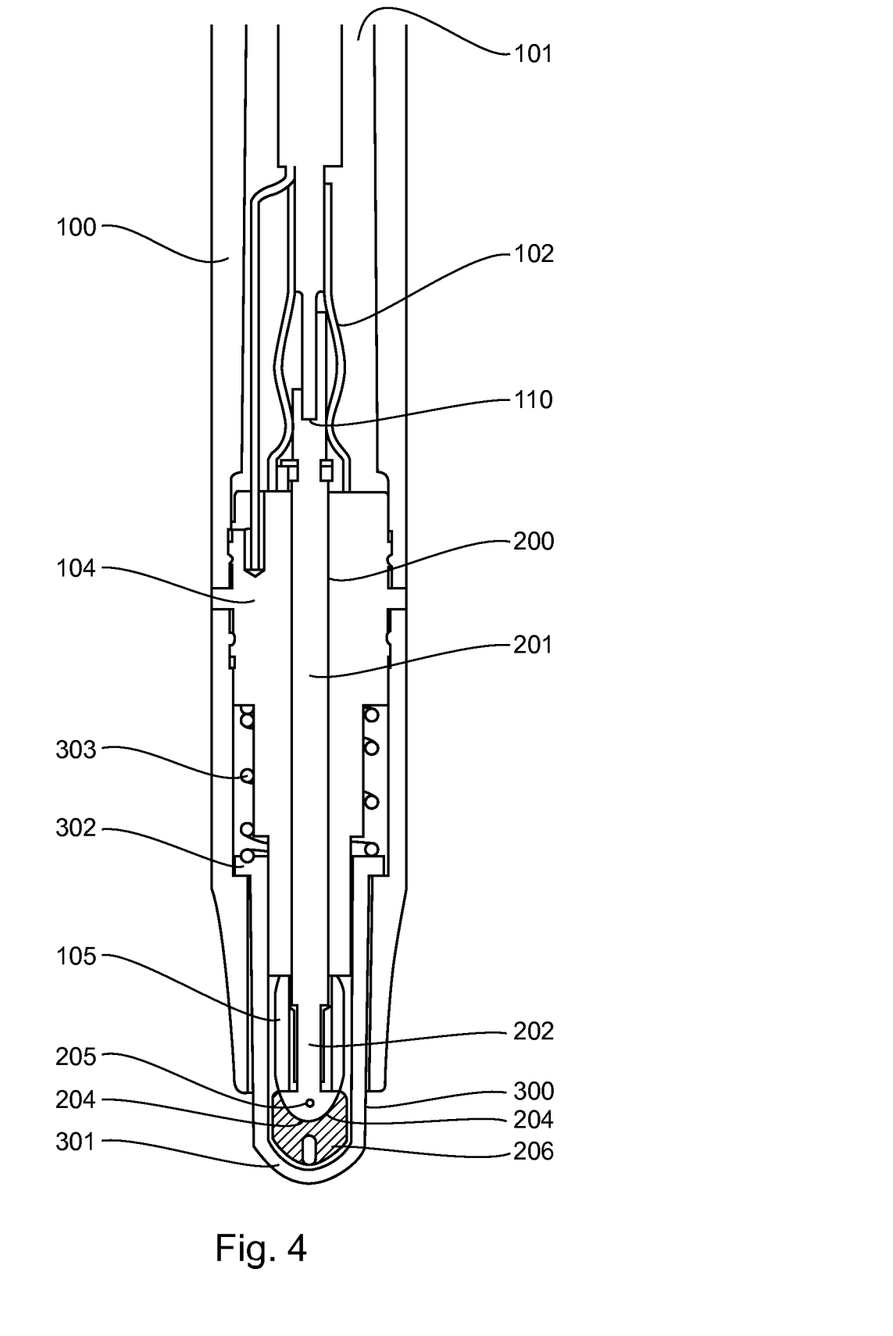
FIG. 4 shows a fourth embodiment of a stylus.

6.2.4 Substantially Hemispherical Reference Element, Mechanical and Deformable Damper In this embodiment, presented with reference to FIG. 4, the stylus comprises a hollow body 100 comprising a housing 101. Usually, this body has an overall tubular shape.

In this housing 101, a reference element 200 is inserted. In the housing 101, in addition to the reference element 200, there is also a screening sheath 102, a shield 103, an insulating shield 104 and an insulating ring 105.

The reference element 200 comprises two distinct portions: a first portion 201 is seated within the housing 101, inside the insulators (insulating shield 104, insulating ring 105) and extends to come into contact with an electrical contact element 110, if any, of the stylus (this is true in the case of an active stylus, and this electrical contact element 110 can be absent in the case of a passive stylus). This first portion 201 is shaped for these functions of maintaining and assembling and possibly of contact inside the stylus.

The second portion 202 comprises a tip 203 having a substantially hemispherical end 204. The central point 205 of the hemispherical end is the reference point serving to evaluate the distance from the pad. The reference point is defined so that a quasi-absence of pressure exerted on the stylus is interpreted as a quasi-absence of pressure (and therefore gives a line of normal thickness). The pressure exerted is interpreted by means of a component which can be implemented either in the tablet itself or in a terminal to which the tablet is connected.

The second portion 202 is covered with a non-conductive casing 300. This casing 300, made of solid and non-deformable material, plays the role of a damper. This casing 300 has a general shape of a cylindrical sleeve comprising a first hemispherical end 301. The internal diameter of the cylindrical sleeve is substantially equal to the diameter of the substantially spherical end 204 of the reference element 200. The hemispherical end 301 is also shaped so that it can receive the substantially spherical end 204 of the tip 203 of the second portion 202 of the reference element 200. The second end of the casing 300 comprises a ring 302. This ring 302 blocks the casing 300 in the housing 101. The casing 300 is mobile in translation depending on the pressure exerted on the stylus. The return of the casing to the initial position is ensured by the use of return means 300 (such as a spring) inserted into the housing 101 and resting on the ring 302.

In addition to the difference of shape of the reference element 200, this embodiment is also different from the previously described embodiment in that the space 206 left vacant between the reference element and comprising a first hemispherical end 301 of the envelope 300 is filled with an electrically charged deformable material. In one specific embodiment of the invention, this material is charged silicone. This electrically charged deformable material modifies the behavior of the stylus. More particularly, since air is a poor dielectric, it is advantageous to replace the air of the third embodiment by a material which has a better conductive effect. This makes it possible to calibrate and adjust the stylus in a more simple way and improve the sensitivity to pressure. More particularly, the perception of the distance between the reference tip and the pad is improved.

In other words, in this embodiment, a material that is more or less conductive and compressible is used to fill the vacuum of air between the casing and the end. To this end, a conductive and highly viscous gel can be used in place instead of the silicone-based material.

Theoretically, if we assume that the work is being done with a flat capacitor, the following formula prevails: capacitance=(permittivity×surface area)/distance. By replacing air with a conductive material, the permittivity and therefore the capacitance (which is the variable measured by the system) is greatly increased as well. In this case, the sensitivity of the system is improved.

As in the preceding embodiments, depending on the pressure exerted by the user on the stylus, the distance between the central reference point and the pad varies. This has the effect of modifying the load on the pad and hence enabling pressure to be deduced.

6.3 Method for Obtaining the Distance of the Sensor Relative to the Pad

As explained here above, the technique described relies on obtaining the distance from the reference point integrated into the stylus to the pad (whether touch pad or not) on which the stylus is used.

Figure 5A:
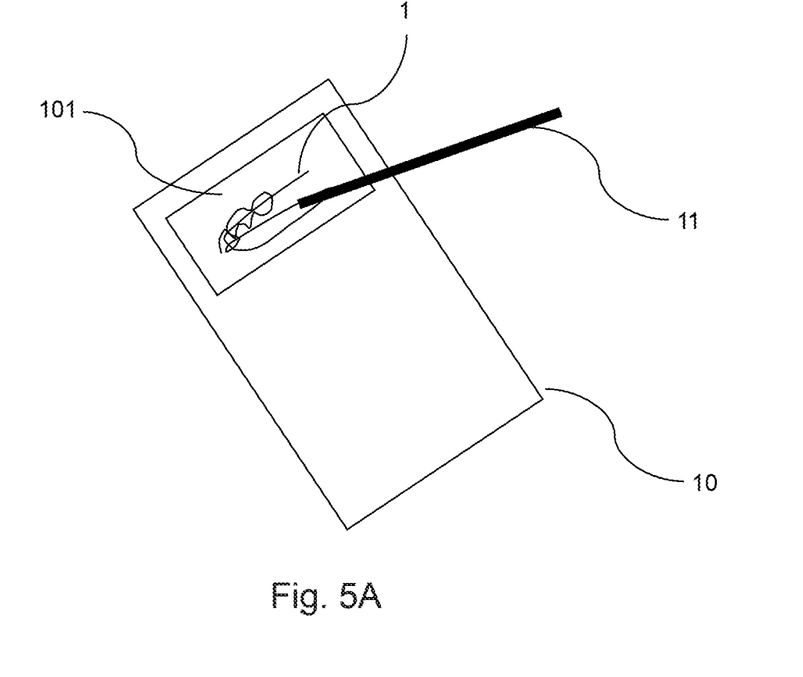
FIGS. 5A and 5B respectively illustrate an example of a system implementing the method of electronic authentication of a handwritten signature and the main steps of this method of authentication according to one embodiment.
Figure 5B:
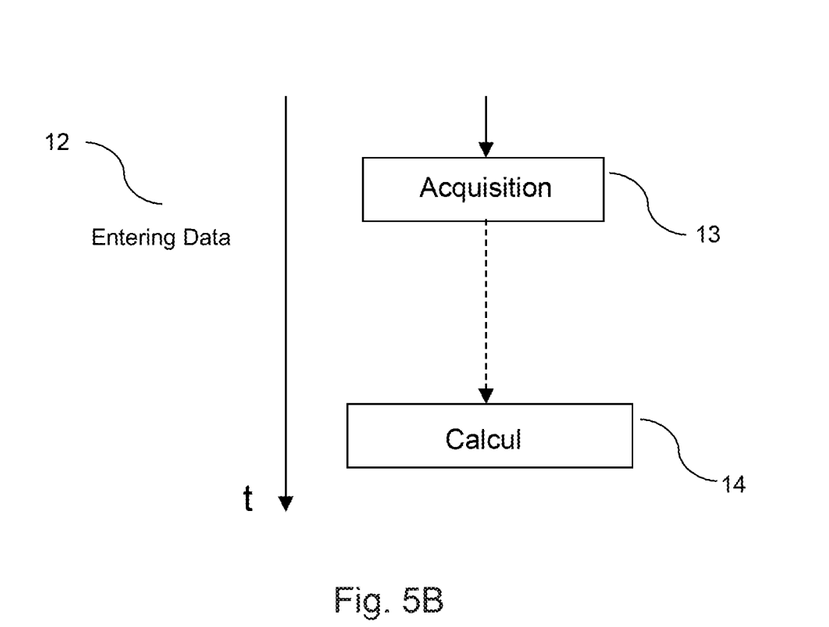

The technique relies on the acquisition, relative to the surface of the pad itself, of an element representing the distance of a stylus during the entry made by the user. For greater simplicity, this element is here below designated by the letter "d" for "distance". The piece of data on distance can be acquired by the pad itself. The technique described then requires no special implementation at the stylus (the stylus is passive), few special settings or no settings at all and little maintenance or no maintenance. Referring now to FIGS. 5A and 5B, we present an example of a system for implementing the technique described and the main steps of the method for measuring the distance implemented in such a system according to one embodiment.

As illustrated in FIG. 5A, we consider a measurement module 10 having a pad 101 comprising a capacitive touch zone on which the user of the data 1 (the entered data can be a signature, an illustration, a sentence, etc) with a view to performing a certain function in the system. The function to be performed can for example be an authentication, a drawing, the writing of a sentence, an entry by means of a virtual keyboard, etc). The measurement module 10 is for example integrated into a payment terminal, a mobile phone, a PDA, a touch-screen tablet, a smartphone, etc. The pieces of data 1 are entered via a stylus 11 adapted to an entry on the capacitive touch zone. This stylus is capable of obtaining the distance from the pad. This is a stylus like those described here above. FIG. 5B presents the main steps of the method for measuring a handwritten signature, implemented in a system as described here above with reference to FIG. 5A.

A step 13 is implemented for acquiring a piece of data representing distance d of the stylus. This step 13 is implemented at at least one instance of the step 12 for entering data, and advantageously throughout the entry of the data. For example, it is possible to acquire 300 samples per second during the entry of the signature to obtain high performance in terms of reliability of measurement. Besides, depending on the type of capacitive touch zone, it is possible to acquire data on distance up to two centimeters above the pad.

According to one variant of this embodiment, the acquisition step enables the acquisition of a plurality of other pieces of data on the position of the stylus relative to the capacitive touch zone of the pad, such as (x,y) coordinates of the stylus on the pad, at several moments of the data entry operation. It must be noted that the coordinates x, y and d are acquired by the capacitive touch zone of the pad itself without requiring any special implementation of the stylus. Besides, this implementation by the pad itself necessitates no settings or few settings and requires no special maintenance, unlike in the case of use of optical sensors on the stylus for example. After the acquisition step 13, as and when the data on distance d is acquired, a step 14 for computing pressure is implemented, delivering a pressure computation result that takes account of the way in which the entry is made by the user.

According to a first variant, the computation step 14 can be implemented after the entry by the user and therefore after the acquisition of all the distance data. This variant is for example implemented when the reference data used for an authentication is available on a remote server, with which communications have to be initiated to enable this reference data to be used.

Figure 6:
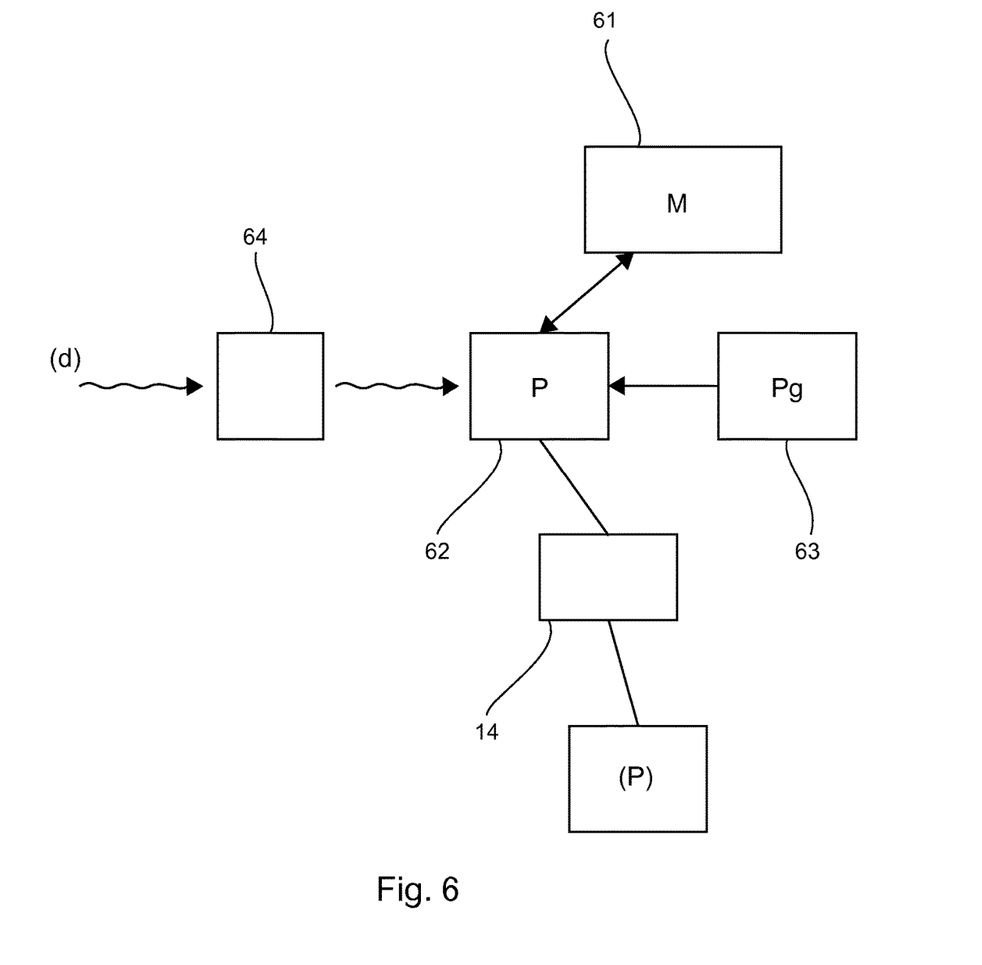

FIG. 6 illustrates a simplified structure of a pressure measurement device according to one embodiment of the invention. For example, the pressure measurement device comprises a memory 61 constituted by a buffer memory, a central processing unit 62, equipped for example with microprocessor and driven by the computer program 63 implementing a method of measurement of the distance of the sensors relative to the pad.

At initialization, the code instructions of the computer program 63 are for example loaded into a memory and then executed by the processor of the central processing unit 62. The central processing unit 62 inputs at least one piece of data representing a variation of distance. The microprocessor of the central processing unit 62 implements the steps of the measuring method according to the instructions of the computer program 63 to evaluate the pressure exerted.

To this end, the multimedia content server comprises, in addition to the buffer memory 61:
  means 64 for acquiring a piece of data representing distance d of the stylus relative to the surface of the pad,
  means 14 for computing pressure.

These means are driven by the microprocessor of the central processing unit 62 to provide a piece of data representing the pressure exerted.

In a predetermined way, the pressure can be computed from distance alone. In this case, a given distance corresponds to a determined pressure. A table of correspondence is used to this end. According to another embodiment, the pressure measured at a given instant depends on the distance d at this instant t and of the pressure determined at the instant t−1.

Although the present disclosure has been described with reference to one or more examples, workers skilled in the art will recognize that changes may be made in form and detail without departing from the scope of the disclosure and/or the appended claims.

The invention claimed is:

1. A stylus for entering data on to an entry pad, said stylus comprising:
  a body comprising a housing;
  a reference element comprising two distinct portions:
    a first portion seated within said housing; and
    a second portion comprising a tip, the tip having a bottom end that is at least hemispherical, a reference point in a center of the bottom end of the second portion being used to evaluate a distance d between the reference point and the entry pad;
  a damper forming a cladding around at least one part of said reference element, comprising an external wall, called an external wall of said damper, which acts as a variator of the distance d between the reference point and the entry pad in response to a change in pressure exerted on the stylus.

2. The stylus according to claim 1, wherein said damper is made out of a flexible and deformable material.

3. The stylus according to claim 1, wherein said damper is hemispherical.

4. The stylus according to claim 1, wherein said bottom end is substantially spherical.

5. The stylus according to claim 1, wherein said damper comprises a cylindrical sleeve comprising a first hemispherical end, the internal diameter of the cylindrical sleeve being substantially equal to the diameter of the at least hemispherical bottom end of the second portion of the reference element.

6. The stylus according to claim 5, wherein said damper furthermore comprises a second end comprising a retaining ring for retaining said damper in said housing.

7. The stylus according to claim 5, wherein a space left vacant between said first hemispherical end and the at least hemispherical bottom end of the reference element is filled with an electrically charged deformable material.

8. The stylus according to claim 5, wherein said damper is mobile in translation according to pressure exerted on the stylus.

9. A method for measuring a pressure exerted during the entry of data by a user, entered on a writing surface of a pad via a stylus, the stylus comprising a reference element comprising two distinct portions:
  a first portion seated within a housing; and
  a second portion comprising a tip, the tip having a bottom end that is at least hemispherical, a reference point in a center of the bottom end of the second portion being used to evaluate a distance d between the reference point and the pad,
  wherein the method comprises:
  acquisition, by said writing surface, at at least one instant of the entry, of at least one piece of data representing the distance d of the reference point of said stylus relative to said pad, in a zone of proximity of said pad; and
  computing pressure exerted on said pad taking account of said distance d.

10. A non-transitory computer-readable memory comprising a computer program product stored thereon, which comprises program code instructions for executing a method for measuring a pressure exerted during the entry of data by a user, entered on a writing surface of a pad via a stylus, when the instructions are executed on a computer, wherein the stylus comprises a reference element comprising two distinct portions:
  a first portion seated within a housing; and
  a second portion comprising a tip, the tip having a bottom end that is at least hemispherical, a reference point in a center of the bottom end of the second portion being used to evaluate a distance d between the reference point and the pad, and
  wherein the method comprises:
  acquisition, by said writing surface, at at least one instant of the entry, of at least one piece of data representing the distance d of the reference point of said stylus relative to said pad, in a zone of proximity of said pad; and
  computing pressure exerted on said pad taking account of said distance d.

* * * * *